United States Patent [19]

Languillat et al.

[11] Patent Number: 4,934,225
[45] Date of Patent: Jun. 19, 1990

[54] DEVICE FOR CUTTING A CONTINUOUSLY FABRICATED TUBE

[75] Inventors: Jean-Paul Languillat, Sur Oreuse; Patrick Raval, Rennes, both of France

[73] Assignee: Lhomme S. A., Pont Sur Yonne, France

[21] Appl. No.: 148,656
[22] PCT Filed: Apr. 24, 1987
[86] PCT No.: PCT/FR87/00140
§ 371 Date: Dec. 28, 1987
§ 102(e) Date: Dec. 28, 1987
[87] PCT Pub. No.: WO87/06517
PCT Pub. Date: Nov. 5, 1987

[30] Foreign Application Priority Data

Apr. 25, 1986 [FR] France ................. 86 06046

[51] Int. Cl.$^5$ ............................. B26D 1/60
[52] U.S. Cl. ....................... 82/53.1; 82/101; 82/102; 83/318
[58] Field of Search ............. 83/318, 367; 82/53.1, 82/54, 101, 102, 93, 94, 95, 96, 97

[56] References Cited

U.S. PATENT DOCUMENTS

| | | | |
|---|---|---|---|
| 2,168,203 | 8/1939 | Green | 82/53.1 |
| 2,582,332 | 1/1952 | Homer . | |
| 3,051,061 | 8/1962 | Baxter | 82/53.1 |
| 3,121,360 | 2/1964 | Hill . | |
| 3,150,574 | 9/1964 | Glasby . | |
| 3,158,074 | 11/1964 | Brigham | 82/53.1 |
| 3,165,034 | 1/1965 | Cuacho | 82/53.1 |
| 3,253,490 | 5/1966 | Bodnar . | |
| 3,267,786 | 8/1966 | Kuts | 83/318 |
| 3,298,266 | 1/1967 | Molnar | 83/318 |
| 3,600,991 | 8/1971 | Kojima | 82/53.1 |

FOREIGN PATENT DOCUMENTS 125175 11/1984 European Pat. Off. .
2392806 12/1978 France .
1106471 3/1968 United Kingdom .

Primary Examiner—Frederick R. Schmidt
Assistant Examiner—Blynn Shideler
Attorney, Agent, or Firm—Sandler, Greenblum & Bernstein

[57] ABSTRACT

An apparatus for cutting a continuously manufactured tube including a knife-holder carriage which is movably mounted for translation and which is provided with a knife activator, a return mechanism for returning the carriage to an initial position following each cutting of a tube section, a driving mechanism for moving the carriage which includes a first driving motor and a first clutch system and a device for determining a section length of tube to be obtained operably connected to control the function of the first clutch system after each cutting based on the desired length of tube to be cut.

17 Claims, 4 Drawing Sheets

DEVICE FOR CUTTING A CONTINUOUSLY FABRICATED TUBE

The invention relates to a device for cutting a continuously manufactured tube and more particularly for a cardboard tube manufactured by means of a machine known as a "spiralling" machine.

It is known to manufacture cardboard tubes in a continuous manner by means of e.g., a "spiralling" machine (designed to spirally roll strips of paper on a mandrel).

It is also known to cut the tube during its manufacture and a particularly interesting cutting device is described in patent FR-2545752 by the same applicant.

The prior device comprises a knife-holder carriage mounted movable in translation and which is driven by the end of the tube itself by means of an abutment mechanically linked to the carriage so that the carriage is in perfect synchronic movement with the raveling of the tube (which is necessary at the moment of cutting), means being provided for returning the carriage to its initial position.

Further, cam systems make it possible to drive the knives during the movement of the knife-holder carriage.

This device which is known nevertheless presents some limits.

In effect, the forward and return cycle time of the carriage corresponding to one cut is significant, which limits allowed minimal lengths.

The driving of the carriage by the end section of the tube limits the minimal possible thickness of the tube (deterioration of the section for too weak thickness).

The installation and adjustment of the driving abutment of the carriage should the desired length for each piece be changed requires a mandatory halting of the machine and therefore a loss of time as well as a waste.

This is why the inventor imagined a device which is much more flexible and more effective nevertheless retaking up the principal of a knife-holding carriage, e.g., of the type previously mentioned.

The device according to the invention is noteworthy in that the carriage is moved by a driving mechanism which is activated by a first rotating motor serving in rotation the raveling speed of the tube and by means of a first clutch system which is guided by a section length determining device to be obtained, so as to control the clutch function of said system after each sectioning and based on said desired lengths.

It is obvious that such a device makes it possible to solve the dual problem, on the one hand, of synchronism between the movement speed of the knife-holding carriage and the raveling speed of the tube and, on the other hand, the determining section lengths.

Using mechanical means to drive the movement of the carriage makes it possible to have more sudden starts and therefore to reduce the duration of each cutting cycle and even to reduce minimal possible lengths while the guiding of the clutch system of a section length determining device permits a great flexibility of work by programming or modifying said lengths during the very manufacture of the tube.

According to one possibility, the clutch system is disengaged during penetration of the knives in the side of the tube at least until said knives cease their cutting action so that the carriage and its mechanism are driven during this time by the tube itself which is in gear with said knives.

The driving mechanism is, for example, a rod-crank type and comprises one rod whose foot is journalled onto the carriage and whose head is in gear with the turning arm of the clutch system.

Nevertheless it is perfectly obvious that it is also possible to use other conventional means such as e.g., a groove instead of the rod, said groove being affixed to a sliding shaft capable of driving the knife-holder carriage.

Without it being strictly mandatory (the motor and clutch system mentioned above being sufficient), but in order to reduce the cutting cycle time and therefore to allow for cutting shorter sections as mentioned above, the means for returning the carriage to its original position further comprise a return mechanism which acts at the end of each cutting while the clutch system is disengaged. The return mechanism mentioned above is for example formed by one or a plurality of pneumatic jacks. Nevertheless such a mechanism does not prove to be very flexible to use because it is difficult to modulate its action based on the performing system of the machine. The inventors have notably found that it could be interesting to maintain a ratio between forward and return respectively speeds of the knife-holder carriage approximately constant in order to avoid risks of too rapid return during adjustments and low speed manufacture. This is why the inventors recommend a device which is noteworthy in that the return mechanism comprises a second driving motor which is connected to a second clutch system while a differential system is combined respectively with said second clutch system, the first driving motor and the second clutch system, so that it may be notably possible to increase the return speed of the carriage in relation to its forward speed by means of said second motor and said differential.

Preferably, in the case of a system fitted with a particular mechanism for returning the carriage to the initial position (jacks or second motor for example) the first clutch system moreover comprises a brake function while position adjusting means of the driving mechanism acts on said brake function so that the return mechanism of the carriage positions the driving mechanism nearby but on this side, of the initial position, said first system being then re-engaged until the position adjusting means acts on the braking function and disengaging function of said first system which halts said mechanism in a determined position.

Also preferably for a device mounted with a return mechanism of the type recommended above, the two driving motors, on the one hand and the two clutch systems on the other hand are of the same type, the clutch systems being further both mounted with a brake function.

According to an embodiment which uses a carriage of the type described in patent FR-2545752 previously mentioned that is in which the knives are moved by mechanical means based on the longitudinal position of the knife-holder carriage, the disengaging of the first system, the return control mechanism following sectioning and the re-engaging of the first system after said carriage return can then be controlled by signals coming from position terminals provided in order to adjust the position of said carriage and/or that of a moving part of the device.

It is obvious that up to now the invention can relate to any type of continuous manufacture of a tube (extrusion, ravelling . . . ).

Nevertheless the invention more particularly relates to continuous manufacture of tubes by means of a spiralling machine. It is known, at least in part, notably as described for example in patent FR-2392806, to determine section lengths by means of a cylinder driven in rotation without sliding by one of the component strips of the tube, before winding, and a rotation speed measuring device of said cylinder to act on the sectioning means. According to an embodiment of the invention the above mentioned known means are here used as means guiding the first driving motor, said rotation speed measuring device acting on a driving means of said motor by means of, possibly, an adjusting means based on a manufacturing type so that information coming from said speed measuring device, possibly corrected by adjustment means, control the driving means which activate said motor so that the rotation speed that it transmits to the first clutch system corresponds to a driving speed of the carriage which may be quasi-identical on at least one part of its trip at the ravelling speed of the tube in formation.

Nevertheless, there is reason to note that if this embodiment is interesting, it is not mandatory (a pulley driven in rotation without sliding on the formation tube itself could e.g., furnish information on the ravelling speed of said tube) etc.

The means and devices can be various in nature. According to one embodiment, the first motor at least is a stepping electric motor, the speed measuring device comprises a coding wheel which is wedged onto the cylinder shaft and which cooperates with a terminal, the driving means is a digital control and the possible regulation means, a frequency converter.

Nevertheless said motor can still be an electric motor with continuous current, alternate current, rotating field, the means and guidance devices then being adapted accordingly, as will be described below.

For determining section length and operation of said clutch systems, there are several possible solutions.

For example, the length determining device can comprise a terminal which acts on the clutch function of the first system, when it detects the passage of the front end of the tube in formation, while said terminal is adjustable in longitudinal position so as to determine a preadjusted length of the section which corresponds to the distance between the resting position of the knives and the position of said terminal.

According to another embodiment for a tube manufactured by means of a spiralling machine, the section length determining device comprises a sensor which acts on the clutch function of the first system when it detects the passage of reference marks printed on the tube in formation or on the last component strip of said tube before winding, said marks being printed in intervals corresponding to desired lengths of the sections.

According to yet another embodiment, the section length determining device comprises an axis driven in rotation by a turning element of the spiralling machine itself, and a coding wheel which is wedged onto said axis and which cooperates with a terminal and at least one preselecting calculator which controls the clutch function of the first clutch system when preselected values introduced on said calculator are reached. Nevertheless, the section length determining means can comprise, as already mentioned and known in part, a cylinder driven by one of the strips and when the speed measuring device can be a coding wheel which is wedged onto the axis of said cylinder and which cooperates with a sensor. In this case, for example, at least one preselection calculator connected to said sensor controls the clutch function of the first system when preselection values introduced on said calculator are reached.

It is obvious in the latter case that, for a device already fitted with a cylinder and possibly a coding wheel and a sensor, for the operation of the first motor as mentioned above, this or these very means can serve in parallel to act, on the one hand, on said motor and, on the other hand, on said preselection calculator.

The invention will be well understood in the reading and the description which follows and which refers to attached drawings.

The illustrated embodiments relate to a cutting device for a continuously manufactured cardboard tube by means of a spiralling machine but it is obvious that they can also be adapted to other types of continuously manufactured tubes.

Figure 1:
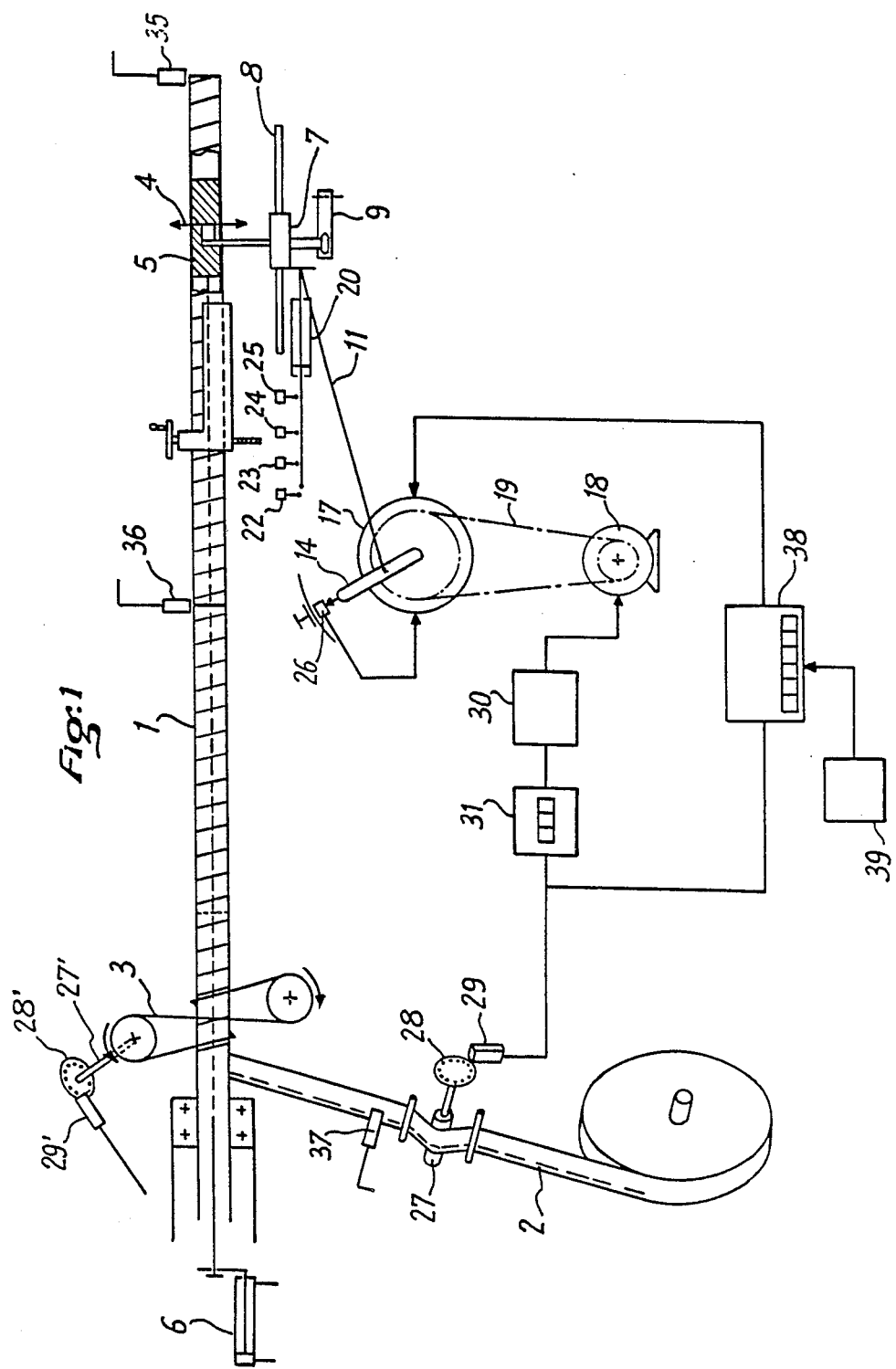
FIG. 1 is a main diagram of a device according to the invention.
Figure 2:
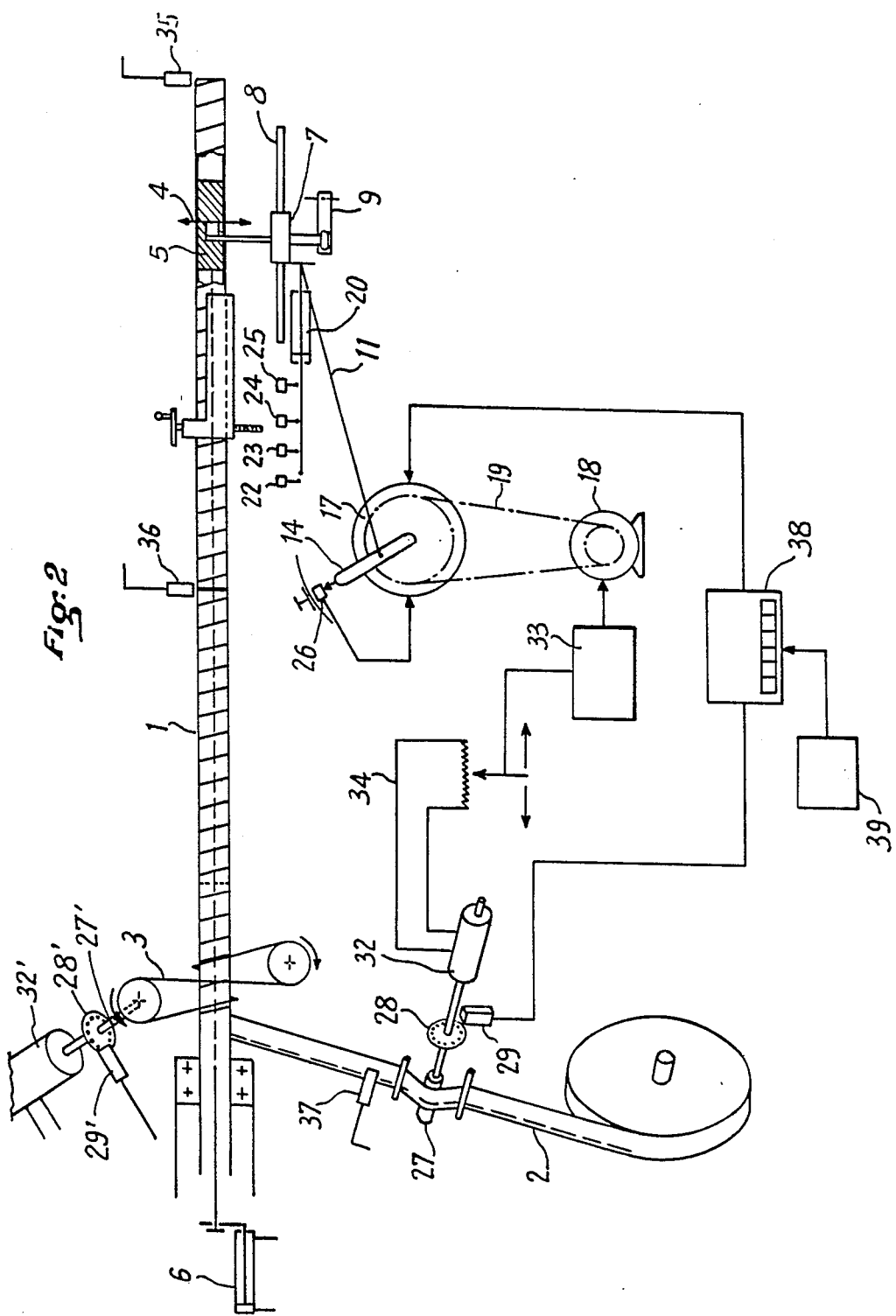
FIG. 2 is a diagram corresponding to FIG. 1 according to another embodiment.

On the drawings, a tube 1 is continuously manufactured by spiral rolling of a plurality of strips such as strip 2 in FIGS. 1 and 2.

Tube 1 is conventionally driven in rotation by a belt 3 (FIG. 1 and 2) and sectioned during manufacture by knives 4 (FIGS. 1 to 3), designed to penetrate the side of the tube until they meet a support mandrel 5, fitted with rear return 6 apparatus (FIGS. 1 and 2).

Knives 4 (only 1 is visible on the drawings) are pivotably mounted on a carriage 7.

Carriage 7 is translationally longitudinally mounted by means for example of a slide 8 while a cam system 9 (FIG. 4) makes it possible, by cooperating with the rotating mounts 10 (FIG. 3) for the knives, to obtain the pivoting of said knives and their penetration in the tube, during movement of said carriage.

There is no sense in describing in more detail this part of the device which is essentially found in patent FR-2545752 mentioned above (different in some modifications such as the shortening of cams 9 . . . ).

In contrast, carriage 7 is here driven in translation by a rod 11 whose foot is journalled on said carriage and the head is journalled on an arm or crank 14.

It is also possible to utilize, as already mentioned, other embodiments and e.g., a groove and a shaft in place of the rod or still other systems.

Arm 14 is affixed in rotation to a first clutch-brake system 17 or indexer (arm 14 affixed to the exit shaft of said system) which is driven in rotation by a first motor 18.

Motor 18 thus makes it possible to drive in rotation, as will be specified below, system 17 which itself activates the rod-crank mechanism 11, 14 so that the carriage 7 can be driven in alternative translation coming and going movement.

If the carriage 7 must have a translation speed perfectly synchronous with the ravelling of tube 1, as will be explained below, during penetration of the knives, its rear return can be accelerated, instead of being simply activated by a system 17, so as to shorten the duration of the sectioning cycle and consequently to reduce the minimal possible length of the sections. To this end, jacks such as 20 (FIGS. 1, 2) are used so as to bring back said carriage to its initial rear position after each sectioning cycle. The inventors nevertheless recommend other means which preferably replace said jacks.

Figure 3:
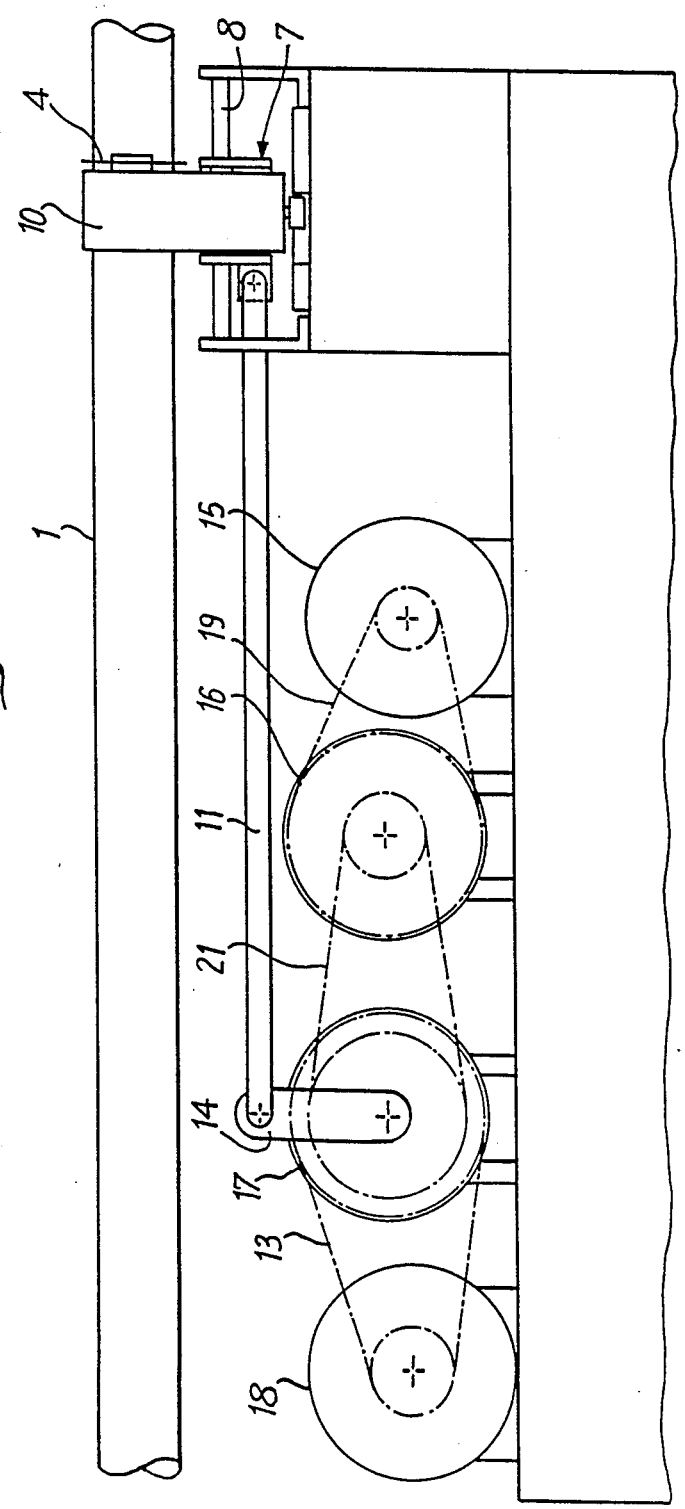
FIG. 3 is an elevation of a device according to the invention.
Figure 4:
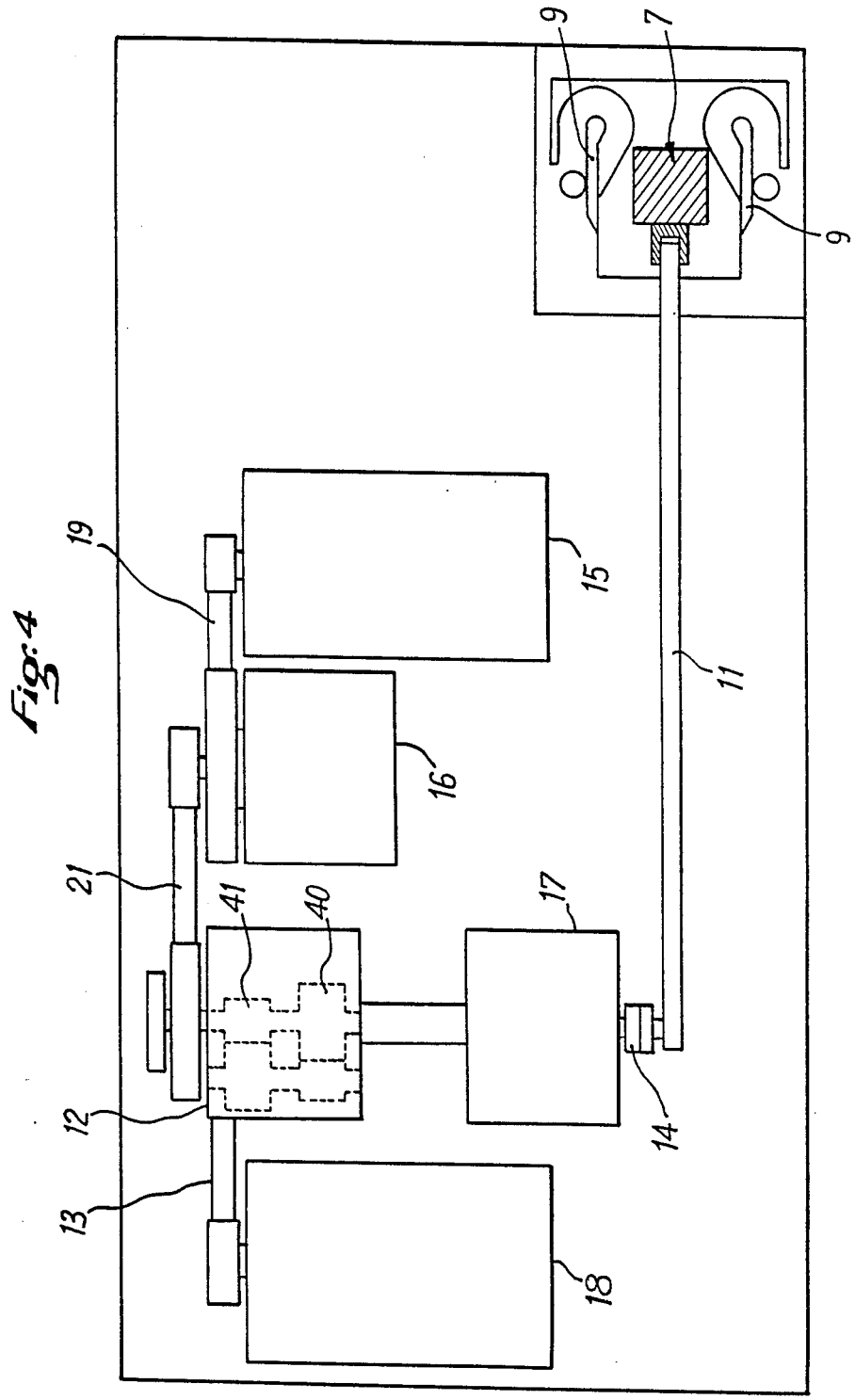
FIG. 4 is a partial plane view, and in part in cross section, of FIG. 3.

Other possible recommended means for return of the carriage are shown in FIGS. 3 and 4. They comprise a second variable speed motor 15 and a second clutch-brake system 16. Motor 15 and system 16 are connected e.g., by a belt 19 while a differential 12 is placed between the motor 18 and system 17, said differential being connected to motor 18 by a belt 13 and to system 16 by a belt 21. Differential 12 here comprises an epicycloidal train with notably a planetary, shown schematically in 40 which drives the shaft of system 17 on which arm 14 is mounted. Another planetary 41 is mechanically linked to system 16 via belt 21, which system is connected to motor 15 via belt 19.

The satellite carrying case of the epicycloidal train is driven by motor 18 via belt 13. During forward movement in which the carriage follows the tube, as will be described below, system 16 is braked so that planetary 41 does not turn, the differential then acting as an ordinary reducer.

During return of carriage 7, system 16 is engaged which then drives planetary 41 in a convenient direction so that the angular speed of planetary 40 is proportionally increased to the speed of motor 15. The speed of motor 15 can preferably be proportionally operated at the speed of motor 18 in an adjustable relation or ratio at will (a relation which increases when the tubes to be cut become shorter so as to reduce the duration of the sectioning cycle).

It is obvious that for rather long tube sections (and more precisely for a length greater than the circumference of the circle intersected by the head of the rod), it is not necessary to accelerate the return movement of the carriage and, in this case, system 16 can be permanently braked while motor 15 can be stopped. For very long tubes it can even be advantageous to slow down return movement of the carriage by reversing the rotation direction of motor 15 and by clutch system 16, the speed reduction always being performed according to a ratio of the motor speeds, which is adjustable. This return speed reduction will, for example, be able to allow for a greater precision of the stopping of arm 14, which is an advantage as will be better understood below.

The position sensors 22 to 25 (diagrammed in FIGS. 1 and 2) are provided on the course of carriage 7 or on the course of a moving part either of jacks 20 (as drawn in FIGS. 1 and 2), or by other means used, 14, 16 or 17 for example.

Sensors 22-25 make it possible to adjust the position of carriage 7 and consequently the position of the knives during their sectioning cycle.

It is thus that, according to the invention, one of the sensors 22-25 (e.g., sensor 24) controls the disengaging of system 17 as soon as knives 4 penetrate tube 1, so that carriage 7 and mechanism 11, 14 are then moved by tube 1 in gear with the knives (synchronism then being perfectly clear between the carriage and the tube). Nevertheless, disengaging of system 17 can be performed a little later, at the time of rear return of said carriage.

Another sensor, e.g. sensor 25, controls the placing under pressure of jacks 20, or clutch system 16 and therefore rapid rear return of the carriage (during the forward course of the carriage, passage of the mechanism to its dead point avoids a collision), while sensor 22 at the end of the rear course controls decompression of the jacks or disengaging and braking of system 16.

Sensor 22 at the end of the movement nevertheless corresponds to a position of arm 14 slightly delayed in relation to its initial position so as to control at the same time the re-engaging of system 17 which will stop in a specific and repetitive position by a signal acting on its brake and disengagement command, said signal coming from position sensor 26 approximate to a mark provided on the turning element of the mechanism (arm 14 for example).

Sensor 23 for example makes it possible to control activating means 6 of mandrel 5.

Sensor 26 and the corresponding reference mark are arranged so as to correspond approximately to the rear dead point of the mechanism so that the said system may be re-engaged suddenly.

Nevertheless, for correct performance, carriage 7 must be moved in translation, at the moment of the knives' penetration, synchronically with the ravelling of the tube.

In order to obtain this synchronization, motor 18 is subjugated to the speed of ravelling of the tube.

To this end, it can be imagined to provide a pulley on the formed tube whose rotation would have been proportional to said speed.

Nevertheless such a system is unreliable and the inventors have imagined taking the information on one of the component strips of the tube before winding.

In order to do this (FIGS. 1 and 2), a cylinder 27 is interposed on the course of a strip (here strip 2, FIGS. 1 and 2) so that the winding of it drives said cylinder in rotation without sliding.

In the embodiment of FIG. 1 on the axis of cylinder 27 a coding wheel 28 is fixed whose reference marks are read by a sensor 29 which acts on a driving means, here a digital control 30 of motor 18 which is in FIG. 1, a stepping motor.

Between the coding wheel 28 and the digital control 30 a frequency converter 31 is fitted.

For a winding means diameter of strip 2 and a given width, it is then possible to select the kinematic characteristics (diameter of cylinder 27, number of steps of wheel 28, digital control characteristics 30 and characteristics of motor 18, transmission ratio between said motor 18 and system 17) so that the translation speed transmitted to the carriage corresponds at best to the winding speed of the tube.

Nevertheless it is obvious that in order to change the manufacturing type and notably the diameter of the tube to be formed and/or the width of strip 2, there is reason to introduce a corrective. The ratio between the winding speed of tube 1 and that of strip 2 is in effect equal to pi D/L (where D is the diameter of the winding means of the strip and L its width) assuming joined turns. Changing at least one of these parameters can be compensated by means of the frequency converter 31 which will act proportionally to the ratio change mentioned above.

Converter 31 thus makes it possible to easily change the manufacturing type by simply introducing a factor of proportionality.

The embodiment of FIG. 2 corresponds to a variation for a DC motor 18. In this embodiment, the axis of cylinder 27 is in gear or common with that of the tachometer 32, the driving means of the motor here being a speed variation 33 while the regulating means is a potentiometer 34.

It is still possible to use an AC electric motor 18, with a tachometer, a driving means as a frequency variation and an adjusting means as a frequency converter.

Other variation are also possible (rotating field motors . . . ).

The invention also relates to means determining section lengths to be obtained.

FIGS. 1 and 2 diagram a plurality of possible embodiments.

In order to determine section lengths it is sufficient to control the operation of clutch system 17 each time that a specific length of tube 1 was wound following the preceeding sectioning.

In order to do this it is possible to control the operation of clutch system 17 by means e.g., of an optical sensor 35 which is capable of detecting the section of the end of tube 1, each section then being in length equal to the distance between said terminal 35 and knives 4 resting (position of terminal 35 being adjustable of course).

According to another embodiment a sensor 36 can read and control accordingly clutch system 17 of the marks printed onto tube 1. These marks are preferably printed obliquely before winding on strip 2 which here would be the covering strip in order to form on tube 1 types of rings (and by conveniently choosing their position based on the width of the strip because it is a matter of determining a length of section on the formed tube).

It is still possible to directly read by means of sensor 37, marks printed on strip 2, the marks being spaced apart based on the length of the strip necessary for manufacturing a certain length of tube.

Nevertheless, these types of adjustments present certain disadvantages. On the one hand, the response time between the reading and the operation of clutch system 17 is significant and, on the other hand, a speed variation of the tube during manufacture between two readings brings about variations in lengths on the obtained sections.

This is why it is possible to use a system already known in part for this function and comprising a cylinder 27 and coding wheel 28 as already described.

In the embodiment of FIG. 1 the cylinder 27, coding wheel 28 and sensor 29 serve both synchronism (driving of motor 18) and the determination of section lengths. In the embodiment of FIG. 2 these elements 27, 28 and 29 are found, but the last two are independent of the synchronism function.

Information of the coding wheel 28 detected by sensor 29 arrive as pulses whose intervals are proportional to the speed of the winding of the strip, to preset register 38, itself connected to system 17. It is sufficient to display on preset register 38, a value corresponding to the length of strip (like a chart for example) necessary for the realization of a certain length of tube formed (a value which is, of course, a function of the characteristics of the tube to be formed and the characteristics of cylinder 27 and coding wheel 28). Each time the length of strip thus selected is obtained, register 38 sends an order to clutch system 17.

Nevertheless it would be possible to imagine an adjusting means of the type described in 31 in reference to FIG. 1 (or even use the same means).

Further, if FIGS. 1 and 2 show a single register 38 it is of course possible to use a plurality of registers in parallel so as to select the one which controls the desired type of manufacture. Also, and by extension, a computer 39 can periodically read into the register a pre-established cutting program, so that the device according to the invention becomes a genuine tube cutter for programmable cutting.

Finally, the section length determination can be carried out by means of axle 27' (FIGS. 1 and 2) driven in rotation, not by strip 2, a turning element of the spiralling itself (winding mandrel or other) as diagrammed in FIGS. 1 and 2. On axle 27', a coding wheel 28' can also be fitted while a register 29' can be connected to the register 38 already described. In the same way this assembly 27', 28', 29' can also be used for the guiding of motor 18 and that is why FIG. 2 shows a tachometer 32' which can replace tachometer 32.

I claim:

1. An apparatus for cutting a continuously manufactured tube moving in translation at a preselected speed, said apparatus comprising a knife-holder carriage which is movably mounted for translation and which is provided with means for activating knives, means for returning said carriage to an initial position following each cutting, a driving means for moving said knife-holder carriage, said driving means comprising a first rotating motor, which is guided in rotation as a function of the speed of translation of said tube, and a first clutch system, and means for determining a section length of tube to be obtained, operably connected to control the function of said first clutch system after each cutting, based upon said length of tube, wherein said clutch system is adapted to be disengaged during penetration of said knives in a side of said tube at least until a cutting action of said knives is stopped, so that said knife-holder carriage and said driving means are driven during said penetration of said knives by said tube.

2. The apparatus according to claim 1 wherein said means for determining said section length comprises a sensor which acts on a clutch of said first clutch system when said sensor detects passage of marks printed on said tube during formation of said tube, said marks being printed at intervals corresponding to desired lengths of tube sections.

3. The apparatus according to claim 1, wherein said driving means further comprises a rod with a foot journalled on said knife-holder carriage a head geared to an arm which turns said first clutch system.

4. The apparatus according to claim 1 wherein said means for returning said knife-holder carriage to an initial position further comprise a return means adapted to be activated upon termination of each cutting while said first clutch system is disengaged.

5. The apparatus according to claim 4 wherein said return means comprises a second driving motor connected to a second clutch system and a differential combined with, respectively, said second clutch system, said first driving motor, and said first clutch system, so that the return speed of said knife-holder carriage is increased in relation to the forward speed of said knife-holder carriage by means of said second motor and said differential.

6. The apparatus according to claim 5 wherein said first driving motor and said second driving motor are of the same type, and said first clutch system and said second clutch system are of the same type and are mounted with a brake.

7. The apparatus according to claim 4 wherein said first clutch system comprises a brake further comprising means for adjusting the position of said driving means from an initial position, said means for adjusting being adapted to act on said brake so that said return means of said knife-holder carriage positions said driving means adjacent said initial position, said first clutch system then being re-engaged until said means for adjusting the position acts on said brake and disengages said first clutch system which halts said driving means in a determined position.

8. The apparatus according to claim 7 comprising a mechanical means for activating said penetration of said knives and said returning said knife-holder carriage to said initial position based on the longitudinal position of said knife-holder carriage such that disengagement of said first clutch system, control of said return means following cutting and re-engagement of said first clutch system following said return of said knife-holder carriage are controlled by signals from terminals for adjusting the position of said knife-holder carriage.

9. The apparatus according to claim 1 further comprising means for operating said first driving motor comprising a cylinder adapted to be driven in rotation without sliding by a component strip of said tube, means for measuring rotation speed of said cylinder adapted to act on a means for driving said first driving motor, an adjusting means for correcting information from said means for measuring rotation speed, so as to control said driving means for activating said first driving motor whereby rotation speed transmitted to said first clutch system corresponds substantially to a driving speed of said knife-holder carriage during at least a portion of tube formation.

10. The apparatus according to claim 9, wherein at least said first driving motor is an electric stepping motor and said means for measuring speed comprises a coding wheel fitted on an axis of said cylinder and cooperates with a sensor and said means for driving comprises a digital control.

11. The apparatus according to claim 9 wherein said at least said first driving motor is an electric motor and said means for measuring speed is a tachometer, and said first driving motor is a speed variator.

12. The apparatus according to claim 9 wherein said at least said first driving motor is an electric motor and said means for measuring speed is a tachometer, and said first driving means is a frequency variator.

13. The apparatus according to claim 9, comprising means for assuring operation of said first motor comprising means for acting on a piloting means by means of said means for measuring rotation speed of said cylinder, and means for acting on a preset register.

14. The apparatus according to claim 13 further comprising a stepping motor comprising a single cylinder and a single coding wheel cooperating with a sensor so as to act in parallel on a digital control of said stepping motor by means of a frequency converter, and on a preset register (38).

15. The apparatus according to claim 1 wherein said means for determining section length comprises an axle driven in rotation by a turning element of a spiralling machine, and a coding wheel fitted on said axle to cooperate with a terminal and at least one preset register for controlling a clutch of said first clutch system when preselection values introduced in said register are reached.

16. The apparatus according to claim 1 wherein said means for determining section length comprises a cylinder driven in rotation without sliding by a component strip of said tube, and a coding wheel fitted on a shaft of said cylinder to cooperate with a terminal wherein at least one preset register is connected to said terminal and controls a clutch of said first clutch system when preselection values introduced in said register are reached.

17. The apparatus according to claim 1, wherein said means for determining a section length of tube comprises a sensor adapted to act on a clutch of said first clutch system when said sensor detects passage of a front end of said tube during tube formation, said sensor being adjustable in a longitudinal position so as to determine a pre-adjusted section length of tube which corresponds to a distance between a resting position of said knives and said terminal.

* * * * *

UNITED STATES PATENT AND TRADEMARK OFFICE
CERTIFICATE OF CORRECTION

PATENT NO. : 4,934,225

DATED : June 19, 1990

INVENTOR(S) : Jean-Paul LANGUILLAT et al.

It is certified that error appears in the above-identified patent and that said Letters Patent is hereby corrected as shown below:

On the title page, in item [87], change "WO87/06517" to ---WO86/06518---

At column 4, line 32, change "FIG." to ---FIGS.---;
At column 4, line 35, change "6 apparatus" to ---apparatus 6---;
At column 4, line 36, change "1" to ---one---; and
At column 4, line 39, change "for example" to ---, for example,---.
At column 5, line 14, after "planetary" insert ---40---; and
At column 5, line 15, change "in 40" to ---in Figure 4,---.
At column 7, line 6, change "variation" to ---variations---.
Claim 14, line 6, delete "(38)".

Signed and Sealed this

Thirtieth Day of June, 1992

*Attest:*

DOUGLAS B. COMER

*Attesting Officer*     *Acting Commissioner of Patents and Trademarks*